United States Patent
Ogawa et al.

(10) Patent No.: US 10,774,942 B2
(45) Date of Patent: Sep. 15, 2020

(54) ELECTRIC VALVE CONTROL DEVICE AND ELECTRIC VALVE DEVICE INCLUDING THE SAME

(71) Applicant: FUJIKOKI CORPORATION, Tokyo (JP)

(72) Inventors: Yoshio Ogawa, Tokyo (JP); Kiyoharu Satou, Tokyo (JP); Akihiro Hayashi, Tokyo (JP)

(73) Assignee: FUJIKOKI CORPORATION, Tokyo (JP)

(*) Notice: Subject to any disclaimer, the term of this patent is extended or adjusted under 35 U.S.C. 154(b) by 340 days.

(21) Appl. No.: 15/710,906

(22) Filed: Sep. 21, 2017

(65) Prior Publication Data
US 2018/0087687 A1 Mar. 29, 2018

(30) Foreign Application Priority Data
Sep. 26, 2016 (JP) .................... 2016-186486

(51) Int. Cl.
| | |
|---|---|
| F16K 31/04 | (2006.01) |
| F16K 11/10 | (2006.01) |
| F25B 1/08 | (2006.01) |
| F25B 13/00 | (2006.01) |
| F25B 49/02 | (2006.01) |
| F25B 41/06 | (2006.01) |

(Continued)

(52) U.S. Cl.
CPC .......... *F16K 31/042* (2013.01); *F16K 11/105* (2013.01); *F25B 41/062* (2013.01); *F25B 49/02* (2013.01); *G05F 1/463* (2013.01); *G08B 1/08* (2013.01); *F25B 1/08* (2013.01); *F25B 13/00* (2013.01)

(58) Field of Classification Search
CPC .................... F25B 41/06; F25B 49/02
See application file for complete search history.

(56) References Cited

U.S. PATENT DOCUMENTS

| | | | | |
|---|---|---|---|---|
| 9,032,749 B2* | 5/2015 | Korenaga | ............... | F24F 3/065 62/222 |
| 2003/0150412 A1* | 8/2003 | Gohou | ................... | F02D 11/10 123/65 PE |

(Continued)

FOREIGN PATENT DOCUMENTS

| | | |
|---|---|---|
| EP | 3051218 A1 | 8/2016 |
| JP | 2004251583 A | 9/2004 |
| JP | 4032993 B2 | 1/2008 |

OTHER PUBLICATIONS

European Office Action in corresponding European Application No. EP 17192271.9, dated Nov. 21, 2018.

(Continued)

*Primary Examiner* — Bickey Dhakal
(74) *Attorney, Agent, or Firm* — Bacon & Thomas, PLLC

(57) ABSTRACT

[Object] An electric valve control device capable of preventing a start delay of an electric valve control (an opening degree control) by shortening a waiting period of a system control device and an electric valve device including the same are provided.

[Solving Means] An electric valve control device 11 outputs a signal indicating an end or an interruption of an initialization operation to an air conditioner ECU 16 after the initialization operation of the electric valve 9 ends or is interrupted.

8 Claims, 5 Drawing Sheets

(51) Int. Cl.
*G05F 1/46* (2006.01)
*G08B 1/08* (2006.01)

(56) References Cited

U.S. PATENT DOCUMENTS

| | | | | |
|---|---|---|---|---|
| 2014/0067233 A1* | 3/2014 | Nishida | .................. | F02D 41/20 |
| | | | | 701/103 |
| 2015/0362236 A1* | 12/2015 | Jiang | ..................... | F25B 41/062 |
| | | | | 137/12 |
| 2016/0221416 A1* | 8/2016 | Jiang | ....................... | F25B 49/02 |

OTHER PUBLICATIONS

Extended European Search Report in corresponding European Application No. EP 17192271.9, dated Jan. 31, 2018.

* cited by examiner

FIG. 2

TRANSMITTING BUFFER REGISTER

| 7 | 6 | 5 | 4 | 3 | 2 | 1 | 0 |
|---|---|---|---|---|---|---|---|

INITIALIZATION STATE BIT
0: NORMAL OPERATION
1: CURRENT INITIALIZATION OPERATION OF ALLOWING ROTATION
   BY MAXIMUM NUBER OF PULSES OR MORE IN VALVE CLOSE DIRECTION
2: CURRENT INITIALIZATION OPERATION OF ALLOWING ROTATION
   BY CURRENT NUBER OF PULSES OR MORE IN VALVE CLOSE DIRECTION
3: END OF INITIALIZATION OPERATION

FIG. 3

RECEIVING BUFFER REGISTER

| 7 | 6 | 5 | 4 | 3 | 2 | 1 | 0 |
|---|---|---|---|---|---|---|---|

INITIALIZATION SIGNAL BIT
0: NORMAL OPERATION
1: INITIALIZATION OPERATION INSTRUCTION OF ALLOWING ROTATION
   BY MAXIMUM NUBER OF PULSES OR MORE IN VALVE CLOSE DIRECTION
2: INITIALIZATION OPERATION INSTRUCTION OF ALLOWING ROTATION
   BY CURRENT NUBER OF PULSES OR MORE IN VALVE CLOSE DIRECTION
3: INITIALIZATION INTERRUPTION INSTRUCTION

ELECTRIC VALVE CONTROL DEVICE AND ELECTRIC VALVE DEVICE INCLUDING THE SAME

TECHNICAL FIELD

The present invention relates to an electric valve control device and an electric valve device including the same, and particularly, to an electric valve control device controlling a valve opening degree of an electric valve and an electric valve device including the same.

BACKGROUND ART

Hitherto, in a refrigeration cycle system used for air conditioners, refrigerating/freezing showcases, and the like, there is a need to adjust a flow rate of a circulating refrigerant for the purpose of a highly efficient operation while stabilizing a cooling capacity and keeping a constant superheat degree. Then, in order to highly accurately perform the adjustment at that time, an electric valve which is an electric expansion valve for operating a valve body by a stepping motor corresponding to an expansion valve for a flow rate control has been widely used. Further, there is also known an electric valve such as a three-way valve (a passage switching valve) of switching a refrigerant flow direction or a shut valve of allowing or interrupting a flow of a refrigerant by opening or closing a refrigerant passage using a stepping motor.

However, in the above-described electric valve using the stepping motor, it is general to control an opening degree by using an open loop control which does not have a feedback of an absolute opening degree (an actual opening degree). Further, the valve body inside the valve stops at a position at the time of the interruption of power while not returning to an initial position when the supply of power is stopped. For that reason, there is a problem in which the valve body stopping position (the absolute opening degree) cannot be accurately recognized when power is input at the next time.

Regarding the control of the above-described electric valve using the stepping motor, an initialization process (also referred to as original positioning, reference positioning, or initialization) is performed when power is normally input for the positioning of the valve body and the opening degree control is started (for example, see Patent Document 1). Here, the initialization process is a process of sufficiently rotating the stepping motor in a valve closing direction or a valve opening direction by the number of pulses exceeding a full stroke from a full open position to a full close position or vice versa, that is, the number of pulses in which a rotor of the stepping motor collides with a rotation stopper called a stopper so that its rotation is stopped. Accordingly, the initial position of the electric valve at 0 pulse or a maximum pulse is defined.

CITATION LIST

Patent Document

Patent Document 1: JP 4032993 B2

SUMMARY OF THE INVENTION

Problem to be Solved by the Invention

Incidentally, in the initialization process, for example, the stepping motor is operated in a control pulse range or more (for example, 700 pulses or more). For this reason, in the electric valve of which a control range is 0 to 500 pulses and an excitation speed is 80 pps, for example, a time equal to or longer than 700÷80=8.75 seconds is necessary. In general, this initialization process is performed by stopping the operation of the compressor constituting the refrigeration cycle (for example, see Patent Document 1), and in this period, the system (the refrigeration cycle system) cannot adjust the flow rate of the fluid (the refrigerant) by controlling the opening degree of the electric valve.

That is, in the related art, the system control device does not take any measure of checking the initialization process state. For this reason, there is a need to wait for a time equal to or longer than a time in which the initialization process (the electric valve initialization operation) is expected to end. As a result, a problem arises in that there is a start delay of the control of the system (that is, the electric valve). Further, even when there is an attempt to perform the electric valve opening degree control during the initialization operation, a problem arises in that the electric valve opening degree control is not performed until the initialization process ends.

The invention has been made in view of the above-described circumstances and an object of the invention is to provide an electric valve control device capable of preventing a start delay of an electric valve control (an opening degree control) by shortening a waiting period of a system control device and an electric valve device including the same.

Means for Solving Problem

In order to solve the above-described problems, according to the invention, there is provided an electric valve control device controlling a valve opening degree of an electric valve including a valve body and a motor driving the valve body, in which a signal indicating an end or an interruption of an electric valve initialization operation is output after the electric valve initialization operation ends or is interrupted.

In a desirable aspect, when a transmission request signal is received from the outside after the electric valve initialization operation ends or is interrupted, a signal indicating the end or the interruption of the initialization operation is output.

In another desirable aspect, a signal indicating the current electric valve initialization operation is output during the electric valve initialization operation.

In a still another desirable aspect, when the transmission request signal is received during the electric valve initialization operation, a signal indicating the current initialization operation is output.

In another desirable aspect, following operations are performed sequentially such that the electric valve initialization operation is started when an initialization operation instruction signal is received from the outside, a signal indicating the current initialization operation is output during the initialization operation, an initialization operation end signal is output when the electric valve initialization operation ends, and the electric valve enters a normal operation state when a normal operation instruction signal is received from the outside.

In another desirable aspect, following operations are performed sequentially such that the electric valve initialization operation is started when an initialization operation instruction signal is received from the outside, a signal indicating the current the initialization operation is output during the initialization operation, the initialization operation is interrupted when an initialization operation interruption instruction signal is received from the outside during the electric valve initialization operation, an initialization operation interruption signal is output, and the electric valve enters a normal operation state when a normal operation instruction signal is received from the outside.

Desirably, the electric valve initialization operation includes a first initialization operation of allowing a rotation in a valve closing direction or a valve opening direction by a predetermined number of pulses equal to or larger than a maximum number of pulses which can be controlled by the electric valve regardless of the current number of pulses of the electric valve and a second initialization operation of allowing a rotation in the valve closing direction or the valve opening direction by the number of pulses derived on the basis of the current number of pulses of the electric valve.

In a further desirable aspect, the initialization operation instruction signal received from the outside includes a first initialization operation instruction signal and a second initialization operation instruction signal.

In a still desirable aspect, an initialization operation end state is written to a transmitting buffer register when the initialization operation ends or is interrupted and the content written in the transmitting buffer register is output to the outside when the transmission request signal is received from the outside.

In a still desirable aspect, a current initialization operation state is written to a transmitting buffer register during the initialization operation and the content written in the transmitting buffer register is output to the outside when the transmission request signal is received from the outside.

In another desirable aspect, the electric valve further includes a storage unit storing a current position of the electric valve, in which when the initialization operation is interrupted during the initialization operation, the valve opening degree of the electric valve is controlled on the basis of the current position stored in the storage unit.

In another desirable aspect, the electric valve further includes a storage unit storing a current position of the electric valve, in which the second initialization operation of allowing the rotation in the valve closing direction by the number of pulses equal to or larger than the current number of pulses of the electric valve or allowing the rotation in the valve opening direction by the number of pulses obtained by subtracting the current number of pulses from the maximum number of pulses on the basis of the number of pulses derived from the current position stored in the storage unit is performed.

In another desirable aspect, the electric valve control device is connected to the outside by a LIN communication or a CAN communication.

Further, an electric valve device of the invention is obtained by integrating the electric valve and the electric valve control device.

Effect of the Invention

According to the invention, since the electric valve control device controlling the valve opening degree of the electric valve outputs a signal indicating the interruption or the end of the initialization operation after the electric valve initialization operation ends or is interrupted, the system control device can check the end or the interruption of the initialization operation. Accordingly, since the electric valve opening degree control can be started after the electric valve control device returns for the normal operation (for example, immediately after the end or the interruption of the initialization operation) after the end or the interruption of the initialization operation, it is possible to prevent a start delay of the electric valve control (the opening degree control) by shortening the waiting period of the system control device.

BRIEF DESCRIPTION OF DRAWINGS

FIG. 2 is a diagram showing a transmitting buffer register in a LIN communication of the electric valve control device shown in FIG. 1;

FIG. 3 is a diagram showing a receiving buffer register in the LIN communication of the electric valve control device shown in FIG. 1;

MODE(S) FOR CARRYING OUT THE INVENTION

Hereinafter, embodiments of the invention will be described with reference to the drawings.

First Embodiment

Figure 1:
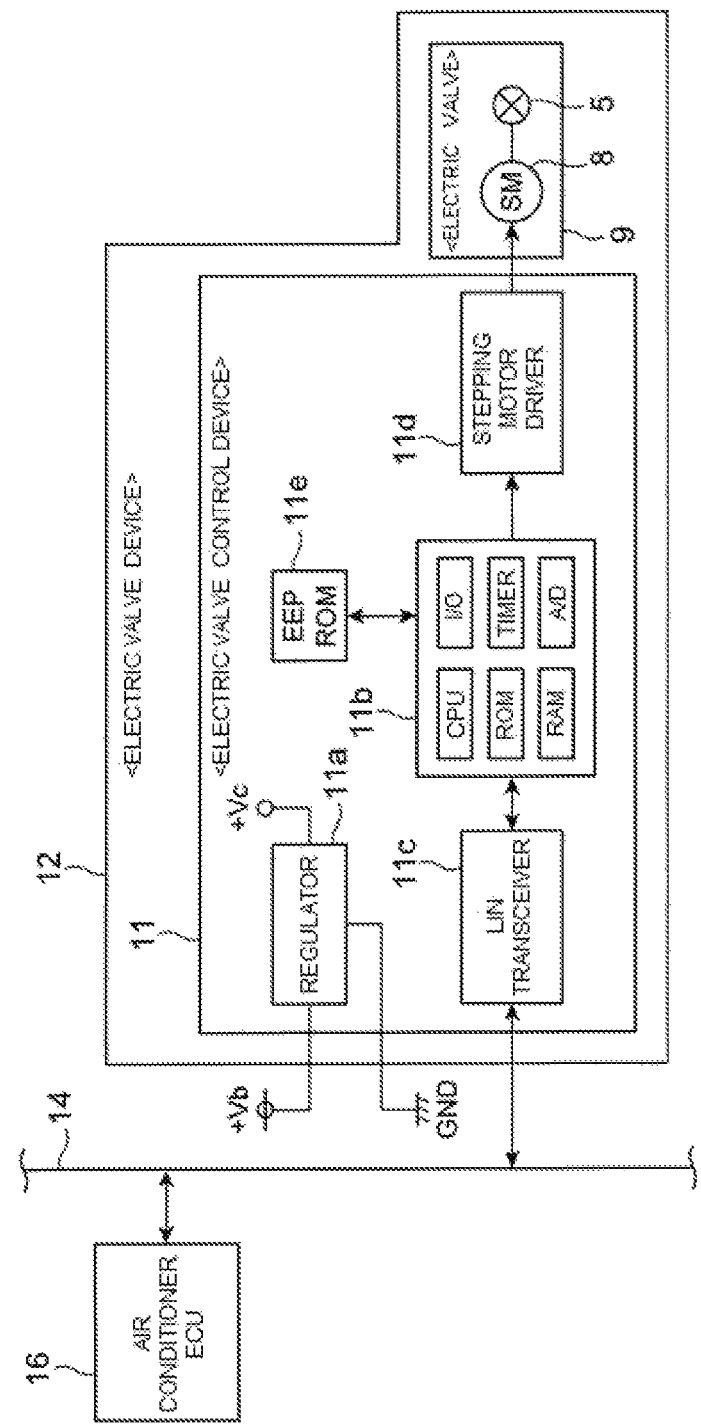
FIG. 1 is a system block diagram showing an electric valve control device according to a first embodiment of the invention and an electric valve device including the same.

FIG. 1 is a system block diagram showing an electric valve control device according to a first embodiment of the invention and an electric valve device including the same. Further, in the following description, an exemplary case in which the electric valve control device according to the invention is applied to an expansion valve of a refrigeration cycle system used in a car air conditioner will be described.

An electric valve device 12 of the embodiment shown in the drawings has a configuration in which an electric valve 9 and an electric valve control device 11 are connected to each other by a lead wire or the like and are integrated with each other while not being separated from each other. Here, the electric valve 9 includes an expansion valve 5 which includes a valve body (not shown) controlling a flow rate of a fluid (a refrigerant) and a stepping motor 8 which drives a valve body of the expansion valve 5 and a valve opening degree of the expansion valve 5 (the electric valve 9) is adjusted by the rotation of the stepping motor 8. In addition, the expansion valve 5 may be a shut valve which opens or closes a refrigerant passage so that the flow of the refrigerant is allowed or interrupted, a three-way valve (a passage switching valve) which switches a refrigerant flow direction, or the like.

Although not shown in the drawings, for example, in a refrigeration cycle system used in a car air conditioner, a compressor, a condenser, (the expansion valve 5 of) the electric valve 9, and an evaporator are sequentially connected to one another through a pipe and a flow rate of a refrigerant flowing through the pipe is controlled by the adjustment of the valve opening degree (the expansion valve 5 of) the electric valve 9.

A battery power (+Vb, GND) of the vehicle is connected to the electric valve control device 11 and, for example, a LIN bus (or a CAN bus) 14 which is an in-vehicle LAN used for a communication inside the vehicle is connected thereto. The electric valve control device 11 serves as a slave node, receives an instruction of an initialization operation or the number of pulses of a stepping motor 8 by a LIN communication signal transmitted from an air conditioner ECU 16 of a master node which is a control device of a system connected to the same LIN bus 14 (in the case of a CAN bus, a CAN communication signal), and controls an opening degree (a valve opening degree) of the electric valve 9 (the expansion valve 5).

Additionally, as a communication method between the air conditioner ECU 16 and the electric valve control device 11, an input/output (LIN communication, CAN communication, etc.) to a serial interface, an input/output to an I/O port by a digital signal (an ON-OFF signal, etc.), an input/output using a wireless connection (Wi-Fi (Registered Trademark), Bluetooth (Registered Trademark), etc), and the like may be exemplified. Here, any method may be adopted and the invention is not limited to the LIN communication or the CAN communication described above.

The electric valve control device 11 mainly includes a regulator 11*a* which generates a power +Vc (for example, +5 Vdc) used in a circuit inside the electric valve control device 11 from the battery power +Vb (for example, +12 Vdc), a microcomputer 11*b* which includes a ROM storing a program controlling the rotation of the stepping motor 8 on the basis of a LIN communication signal transmitted from the air conditioner ECU 16 via the LIN bus 14, a CPU which executes the program stored in the ROM or performs a calculation process, a RAM which temporarily stores data necessary for executing a program of communication data or a situation of an initialization operation, an I/O circuit which performs an input/output with respect to a peripheral circuit, a timer which counts a time of an interrupting process, and an A/D converter converting an analog signal into a digital signal value, a LIN transceiver 11*c* which is a communication unit connected to the LIN bus 14 and converting a voltage level of the LIN bus 14 into a voltage level of a circuit inside the electric valve control device 11 so as to enable a LIN communication with the microcomputer 11*b*, a stepping motor driver 11*d* which controls the rotation of the stepping motor 8 of the electric valve 9 on the basis of a driving signal from the microcomputer 11*b*, and an EEPROM 11*e* which is connected to the microcomputer 11*b* and is a nonvolatile memory serving a storage unit storing data to be stored even in the event of the disconnection of the battery power among the RAM data of the microcomputer 11*b*. Here, these components are mounted on a circuit board (not shown). By the microcomputer 11*b* and the stepping motor driver 11*d*, both the valve opening degree control unit and the initialization control unit are obtained. In addition, an IC obtained by integrating two or more of the regulator 11*a*, LIN transceiver 11*c*, the stepping motor driver 11*d*, the EEPROM 11*e*, and the microcomputer 11*b* may be used. In that case, a further decrease in device can be realized.

In addition, a detailed configuration of the electric valve control device 11 is not limited to the above-described configuration, and any configuration may be adopted as long as the invention can be carried out (that is, when the control of the valve opening degree of the electric valve 9 and the initialization control can be performed).

Since there is a need to determine, for example, a 0 pulse as the initial position of the electric valve 9 when the battery power is input to the electric valve control device 11, the air conditioner ECU 16 transmits an instruction of executing an initialization operation (a first initialization operation) of rotating the stepping motor 8 in the valve closing direction, for example, by the maximum number of pulses or more to the electric valve control device 11 by a LIN communication signal via the LIN bus 14.

Since the current position (the number of pulses) of the stepping motor 8 is not given when the battery power is input, the electric valve control device 11 receiving the LIN communication signal performs an initialization process (an initialization operation for the electric valve 9) (initial positioning of 0 pulse) of rotating the stepping motor 8 in the valve closing direction by the number of pulses (for example, 700 pulses or more) obtained by adding the number of pulses enough for a rotor to collide with a stopper (a rotation stopper) to the maximum number of pulses (for example, 500 pulses) which can be controlled by the electric valve 9. In addition, an initialization process of rotating the stepping motor 8 in the valve opening direction may be performed instead of an initialization process of rotating the stepping motor in the valve closing direction.

In addition, in this example, in order to perform the initialization process, the electric valve control device 11 is provided with a transmitting buffer register (for two bits) for writing an initialization state bit (0 to 3) shown in FIG. 2 and a receiving buffer register (for two bits) for writing an initialization signal bit (0 to 3) shown in FIG. 3. Accordingly, the content received from the air conditioner ECU 16 (the instruction content of the air conditioner ECU 16) is written in the receiving buffer register and the content transmitted from the electric valve control device 11 to the air conditioner ECU 16 (the state of the initialization operation) is written in the transmitting buffer register (which will be described in detail later).

Figure 4:
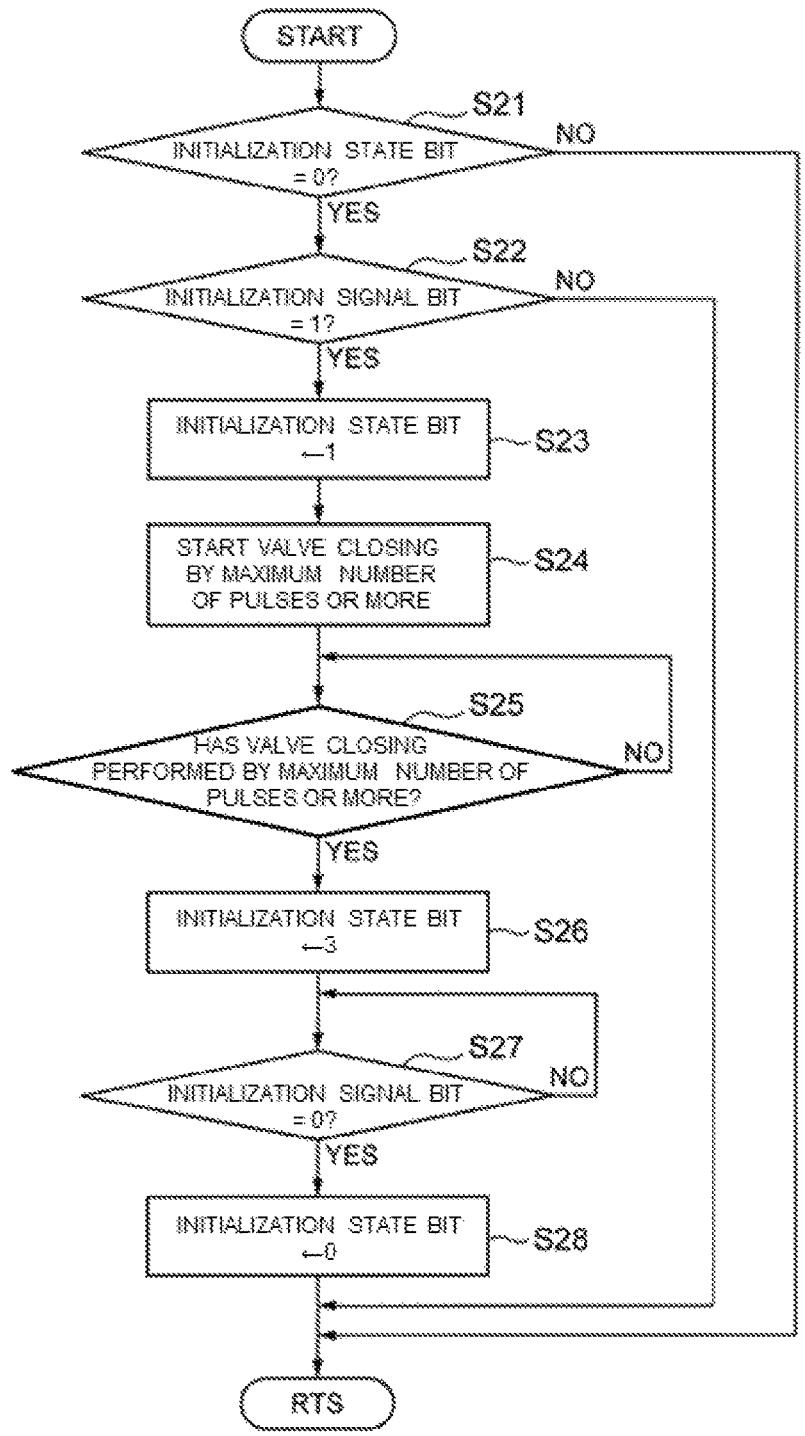
FIG. 4 is a flowchart showing a process flow of an initialization process using the electric valve control device shown in FIG. 1.

Next, a process flow of an initialization process using (the microcomputer 11*b* of) the electric valve control device 11 will be described with reference to FIG. 4. This process is performed, for example, every regular time.

First, when the microcomputer 11*b* receives an instruction of the initialization operation of rotating the stepping motor in the valve closing direction so that the initialization signal bit of the receiving buffer register is 1 (the maximum number of pulses or more) from the air conditioner ECU 16 (step S22: Yes) while the initialization state bit of the transmitting buffer register is 0 (the normal operation) (step S21: Yes), the initialization state bit of the transmitting buffer register is set to 1 (the initialization operation of rotating the stepping motor in the valve closing direction by the maximum number of pulses or more) (step S23) so that the stepping motor 8 is rotated in the valve closing direction by the maximum number of pulses or more (for example, 700 pulses or more) (step S24).

A signal indicating the current initialization operation is output from the electric valve control device 11 to the air conditioner ECU 16, and the air conditioner ECU 16 stops the opening degree control of the electric valve 9 while the air conditioner ECU 16 receives the signal indicating the current initialization operation.

The microcomputer 11*b* checks whether the stepping motor 8 rotates in the valve closing direction at the maximum number of pulses or more (for example, 700 pulses or more) (step S25), and when a state where the stepping motor 8 rotates in the valve closing direction at the maximum number of pulses or more is checked (that is, when the initialization operation ends), the initialization state bit of the transmitting buffer register is set to 3 (the end of the initialization operation) (step S26).

When the air conditioner ECU 16 receives the initialization operation end signal output from the electric valve control device 11, the electric valve control device 11 transmits an instruction signal of setting the initialization signal bit of the receiving buffer register to 0 (the normal operation) to the microcomputer 11b.

Next, when the microcomputer 11b receives an operation instruction of setting the initialization signal bit of receiving buffer register to 0 (the normal operation) from the air conditioner ECU 16 (step S27: Yes), the initialization state bit of the transmitting buffer register is set to 0 (the normal operation) (step S28), the electric valve 9 enters the normal operation state, and the opening degree control of the electric valve 9 is started in accordance with the instruction of the air conditioner ECU 16.

In addition, when the initialization state bit of the transmitting buffer register is not 0 (the normal operation) (step S21: No) or the initialization signal (the initialization operation instruction signal) is not received from the air conditioner ECU 16 (step S22: No), the process ends without performing anything.

When the microcomputer 11b receives the transmission request signal from the air conditioner ECU 16 via the LIN bus 14 according to the LIN communication, the content of the transmitting buffer register at that time is transmitted to the air conditioner ECU 16 as the LIN communication signal via the LIN transceiver 11c corresponding to a communication unit and the LIN bus 14. Accordingly, the air conditioner ECU 16 which is an external master node can check the initialization operation state of the electric valve 9 (the current initialization operation state, the initialization operation end state, the normal operation state capable of controlling the valve opening degree of the electric valve).

In this way, in the electric valve control device 11 of the embodiment, a signal indicating the end of the initialization operation is output after the end of the initialization operation of the electric valve 9. For this reason, the air conditioner ECU 16 can check the initialization operation state, that is, the end of the initialization operation. Accordingly, since the valve opening degree control of the electric valve 9 can be performed after the electric valve control device 11 returns for the normal operation (for example, immediately after the end of the initialization operation) after the end of the initialization operation, it is possible to prevent a start delay of the control (the opening degree control) of the electric valve 9 by shortening the waiting period of the air conditioner ECU 16.

Second Embodiment

Figure 5:
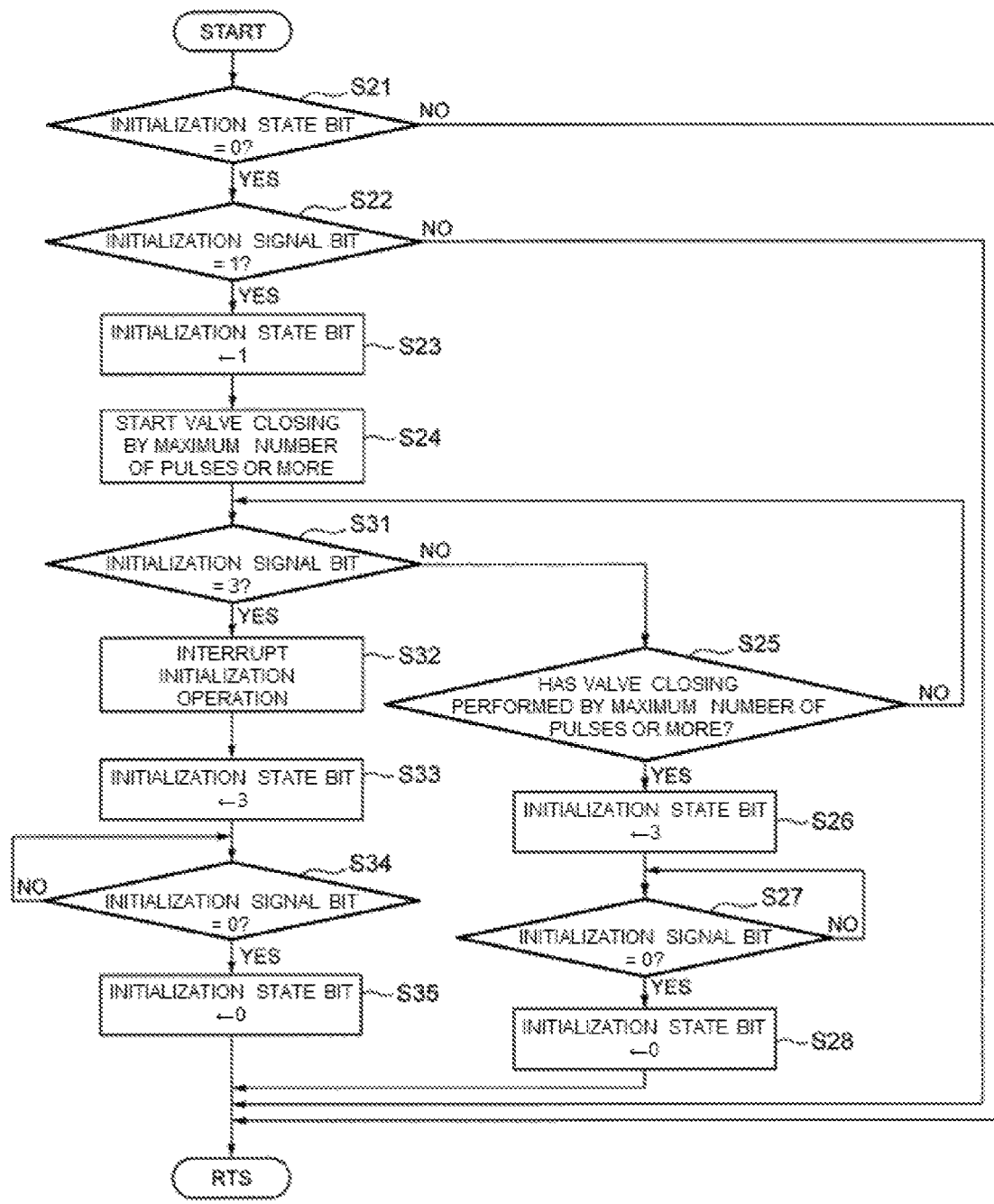
FIG. 5 is a flowchart showing a process flow of an initialization process using an electric valve control device according to a second embodiment of the invention.

Next, a process flow of an initialization process using (the microcomputer 11b of) the electric valve control device according to a second embodiment of the invention will be described with reference to FIG. 5. The configurations of the electric valve control device of the second embodiment and the electric valve device including the same are the same as those of the electric valve control device 11 of the first embodiment and the electric valve device 12 including the same, but a difference from the first embodiment is that the initialization operation is interrupted during the initialization operation. Thus, only the difference will be described below. Then, the same reference numerals will be given to the same components as those of the first embodiment and the detailed description will be omitted.

That is, the microcomputer 11b monitors the initialization signal bit of the receiving buffer register during the initialization operation (after the start of the initialization operation in step S24). Then, when the microcomputer receives an operation instruction of setting the initialization signal bit of the receiving buffer register to 3 (the initialization operation interruption instruction) from the air conditioner ECU 16 (step S31: Yes), the initialization operation is interrupted at that time (step S32).

When the microcomputer 11b ends the initialization operation interruption process, the initialization state bit of the transmitting buffer register is set to 3 (the end of the initialization operation) (step S33).

When the air conditioner ECU 16 receives the initialization operation end signal output from the electric valve control device 11, an instruction signal of setting the initialization signal bit of the receiving buffer register to 0 (the normal operation) is transmitted to the microcomputer 11b.

Next, when the microcomputer 11b receives an operation instruction of setting the initialization signal bit of the receiving buffer register to 0 (the normal operation) from the air conditioner ECU 16 (step S34: Yes), the initialization state bit of the transmitting buffer register is set to 0 (the normal operation) (step S35), the electric valve 9 enters the normal operation state, and the opening degree control of the electric valve 9 is started in accordance with the instruction of the air conditioner ECU 16.

Here, when the microcomputer 11b interrupts the initialization operation during the initialization operation as described above, the valve opening degree of the electric valve 9 is controlled on the basis of the current number of pulses (corresponding to the current position) of the stepping motor 8 of the electric valve 9 stored in the EEPROM 11e (or the RAM).

In addition, when an operation instruction of setting the initialization signal bit of the receiving buffer register to 3 (the initialization operation interruption instruction) is not received from the air conditioner ECU 16 (step S31: No), the processes of step S25 to S28 shown in FIG. 4 are performed.

In this way, in the electric valve control device 11 of the embodiment, since a signal indicating the end of the initialization operation is output after the interruption of the initialization operation of the electric valve 9, the air conditioner ECU 16 can check the initialization operation state, that is, the interruption of the initialization operation. Accordingly, since the opening degree control of the electric valve 9 can be started after the electric valve control device 11 returns for the normal operation (for example, immediately after the interruption of the initialization operation) after the interruption of the initialization operation, it is possible to prevent a start delay of the control (the opening degree control) of the electric valve 9 by shortening the waiting period of the air conditioner ECU 16, for example, even when there is a need to change the opening degree of the electric valve 9 during the initialization operation.

Further, when the initialization operation is interrupted during the initialization operation, the valve opening degree of the electric valve 9 is controlled on the basis of the current number of pulses (corresponding to the current position) of the stepping motor 8 of the electric valve 9 stored in the EEPROM 11e (or the RAM). For this reason, it is possible to accurately control the valve opening degree of the electric valve 9 even when the initialization operation is interrupted.

In addition, in the electric valve control device 11 of the embodiment, a signal indicating the end of the initialization operation is output after the interruption of the initialization operation of the electric valve 9, but a signal indicating the interruption of the initialization operation may be output instead of the signal indicating the end of the initialization operation. That is, a bit indicating the interruption of the initialization operation may be provided in the transmitting buffer register separately from the initialization operation end bit and may be used separately from the bit indicating the end of the initialization operation of the first embodiment. For example, when the initialization state bit indicating the end of the initialization operation is set to 3 (the end of the initialization operation) and the initialization state bit indicating the interruption of the initialization operation is set to 4 (the interruption of the initialization operation), the initialization state bit of the transmitting buffer register may be set to 3 (the end of the initialization operation) when the initialization operation ends without any interruption and the initialization state bit of the transmitting buffer register may be set to 4 (the interruption of the initialization operation) when the initialization operation is interrupted.

Third Embodiment

Figure 6:
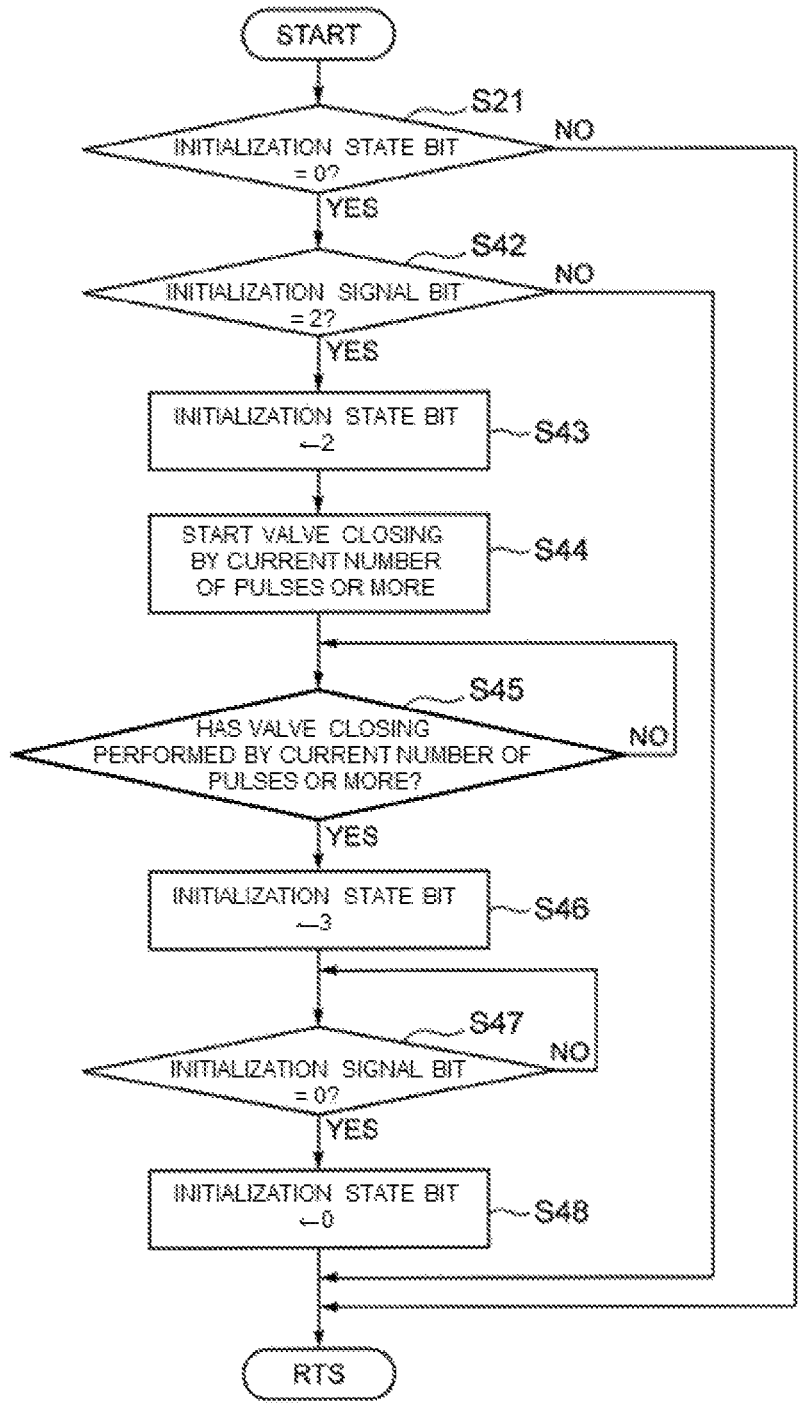
FIG. 6 is a flowchart showing a process flow of an initialization process using an electric valve control device according to a third embodiment of the invention.

Next, a process flow of an initialization process using (the microcomputer 11b of) the electric valve control device according to a third embodiment of the invention will be described with reference to FIG. 6. The configurations of the electric valve control device of the third embodiment and the electric valve device including the same are the same as those of the electric valve control device 11 of the first embodiment and the electric valve device 12 including the same, but a difference from the first embodiment is that the electric valve control device 11 knows the current position (the number of pulses) of the stepping motor 8 and performs the initialization process (the initialization operation or the second initialization operation) (the initial positioning of 0 pulse) of rotating the stepping motor 8 in the valve closing direction by the number of pulses obtained by adding the number of pulses enough for the rotor to reliably collide with the stopper at the current position (the number of pulses). Thus, only the difference will be described below. Then, the same reference numerals will be given to the same components as those of the first embodiment and the detailed description will be omitted.

First, when the microcomputer 11b receives an instruction of the initialization operation of rotating the stepping motor in the valve closing direction so that the initialization signal bit of the receiving buffer register is 2 (the current number of pulses or more) from the air conditioner ECU 16 (step S42: Yes) while the initialization state bit of the transmitting buffer register is 0 (the normal operation) (step S21: Yes), the initialization state bit of the transmitting buffer register is set to 2 (the initialization operation of rotating the stepping motor in the valve closing direction by the current number of pulses or more) (step S43) so that the stepping motor 8 is rotated in the valve closing direction by the current number of pulses or more (step S44).

In addition, the number of pulses necessary for the initialization operation in this case (the number of pulses for the initialization operation) can be calculated by adding a predetermined number of pulses to the current number of pulses of the stepping motor 8 of the electric valve 9 stored in the EEPROM 11e (or the RAM) (for example, when the current number of pulses is 100 pulses, 140 pulses are obtained by adding a predetermined number of pulses corresponding to 40 pulses to the current number of pulses) or applying a predetermined coefficient thereto.

Here, a method of deriving the number of pulses for the initialization operation of the embodiment will be described by exemplifying another example. In the electric valve 9 of which the maximum number of pulses is 500 pulses, when the current number of pulses of the stepping motor 8 of the electric valve 9 stored in the EEPROM 11e (or the RAM) is 200 pulses, the number of pulses for the initialization operation rotating the stepping motor 8 in the valve closing direction is set to 200 pulses or more (for example, 240 pulses obtained by adding a predetermined number of pulses corresponding to 40 pulses to 200 pulses). Further, the number of pulses for the initialization operation of rotating the stepping motor 8 in the valve opening direction is set to the number of pulses (300 pulses) or more obtained by subtracting the current number of pulses (200 pulses) from the maximum number of pulses (500 pulses) (for example, 340 pulses obtained by adding a predetermined number of pulses corresponding to 40 pulses to 300 pulses).

When a signal indicating the current initialization operation is output from the electric valve control device 11 to the air conditioner ECU 16, the air conditioner ECU 16 interrupts the opening degree control of the electric valve 9 while the air conditioner ECU 16 receives a signal indicating the current initialization operation.

The microcomputer 11b checks whether the stepping motor 8 rotates by the current number of pulses or more in the valve closing direction every regular time (step S45). Then, when the microcomputer checks that the stepping motor 8 rotates by the current number of pulses or more in the valve closing direction (that is, when the initialization operation ends), the initialization state bit of the transmitting buffer register is set to 3 (the end of the initialization operation) (step S46).

When the air conditioner ECU 16 receives the initialization operation end signal output from the electric valve control device 11, the electric valve control device 11 transmits an instruction signal of setting the initialization signal bit of the receiving buffer register to 0 (the normal operation) to the microcomputer 11b.

Next, when the microcomputer 11b receives an instruction operation of setting the initialization signal bit of the receiving buffer register to 0 (the normal operation) from the air conditioner ECU 16 (step S47: Yes), the initialization state bit of the transmitting buffer register is set to 0 (the normal operation) (step S48), the electric valve 9 enters the normal operation state, and the opening degree control of the electric valve 9 is started in accordance with the instruction of the air conditioner ECU 16.

In this way, in the electric valve control device 11 of the embodiment, since the same operation and effect as those of the first embodiment can be obtained and the initialization operation of the electric valve 9 is performed by using the number of pulses derived from the current number of pulses (corresponding to the current position) of the stepping motor 8 of the electric valve 9 stored in the EEPROM 11e (or the RAM), it is possible to shorten a time necessary for the initialization operation.

In addition, in the first to third embodiments, a case has been exemplified in which the electric valve control device 11 and the electric valve device 12 are applied to the expansion valve 5 (the electric valve 9) used in the refrigeration cycle system of the car air conditioner, but the invention is not limited to the expansion valve 5. In the case of the electric valve including a fluid inlet, a fluid outlet, a valve body controlling a flow rate of a fluid flowing out of the outlet, and a motor driving the valve body, the electric valve control device 11 and the electric valve device 12 according to the invention can be, of course, employed. Further, for example, a motored shut valve which allows or interrupts a flow of a refrigerant by opening or closing a refrigerant passage or a passage switching valve such as a three-way valve or a four-way valve switching a refrigerant flow direction may be, of course, employed.

EXPLANATIONS OF LETTERS OR NUMERALS 5 expansion valve
8 stepping motor
9 electric valve
11 electric valve control device
11a regulator
11b microcomputer
11c LIN transceiver
11d stepping motor driver
11e EEPROM (storage unit)
12 electric valve device
14 LIN bus
16 air conditioner ECU

The invention claimed is:

1. An electric valve control device for controlling a valve opening degree of an electric valve including a valve body and a stepping motor driving the valve body, the electric valve control device comprising:
a microcomputer configured to provide an initialization process and an interrupted process, wherein the initialization process comprises the following operations, performed sequentially:
starting an electric valve initialization operation when an initialization operation instruction signal is received from a master node,
transmitting a signal indicating the electric valve initialization operation to the master node during the electric valve initialization operation,
transmitting an initialization operation end signal to the master node when the electric valve initialization operation ends,
configuring the electric valve to enter a normal operation state when a normal operation instruction signal is received from the master node, and
transmitting a signal indicating the electric valve entered the normal operation state to the master node,
wherein the interrupted process comprises following operations, performed sequentially:
starting the electric valve initialization operation when the initialization operation instruction signal is received from the master node,
transmitting the signal indicating the electric valve initialization operation to the master node during the electric valve initialization operation,
interrupting the electric valve initialization operation when an initialization operation interruption instruction signal is received from the master node during the electric valve initialization operation,
transmitting an initialization operation interruption signal to the master node,
configuring the electric valve to enter the normal operation state when the normal operation instruction signal is received from the master node, and
transmitting the signal indicating the electric valve entered the normal operation state to the master node,
wherein the microcomputer further comprises a storage unit storing a current position of the electric valve,
wherein the microcomputer is further configured to perform the operation: when the initialization operation is interrupted during the initialization operation, and then the initialization operation interruption instruction signal is received from the master node to configure the electric valve in the normal operation state, controlling the valve opening degree of the electric valve on the basis of the current position stored in the storage unit.

2. The electric valve control device according to claim 1, wherein the microcomputer is further configured to perform the following operation:
controlling the valve opening degree of the electric valve based on a number of pulses of the stepping motor, the number of pulses corresponding to a rotation of the stepping motor, within a range of a full stroke between a full open position and a full close position,
wherein the microcomputer further comprises a storage unit storing a current position of the electric valve that corresponds to the current number of pulses of the stepping motor,
wherein the electric valve initialization operation includes a first initialization operation of allowing a rotation of the stepping motor in a valve closing direction by a predetermined number of pulses equal to or larger than a maximum number of pulses for driving the valve in full stroke, or
a second initialization operation of allowing a rotation of the stepping motor in the valve closing direction by a number of pulses obtained by subtracting at least the number of pulses that corresponds to the current position of the electric valve stored in the storage unit from the maximum number of pulses.

3. The electric valve control device according to claim 1, wherein the microcomputer is further configured to perform the following operations:
writing an initialization operation end state to a transmitting buffer register when the electric valve initialization operation ends and
transmitting the content written in the transmitting buffer register to the master node when a transmission request signal is received from the master node.

4. The electric valve control device according to claim 1, wherein the microcomputer is further configured to perform the following operations:
writing a current initialization operation end state to a transmitting buffer register when the electric valve initialization operation is interrupted, and
transmitting the content written in the transmitting buffer register to the master node when a transmission request signal is received from the master node.

5. The electric valve control device according to claim 1, wherein the microcomputer is further configured to perform the following operations:
writing a current initialization operation state to a transmitting buffer register during the initialization operation, and
transmitting the content written in the transmitting buffer register to the master node when the transmission request signal is received from the master node.

6. The electric valve control device according to claim 1, wherein the electric valve control device is connected to the master node by a LIN communication or a CAN communication.

7. An electric valve device obtained by integrating the electric valve and the electric valve control device according to claim 1.

8. The electric valve control device according to claim 1, wherein the microcomputer is further configured to perform the following operation:

controlling the valve opening degree of the electric valve based on a number of pulses of the stepping motor, the number of pulses corresponding to a rotation of the stepping motor, within a range of a full stroke between a full open position and a full close position, wherein the microcomputer further comprises a storage unit storing a current position of the electric valve that corresponds to the current number of pulses of the stepping motor, wherein the electric valve initialization operation includes
- a first initialization operation of allowing a rotation of the stepping motor in a valve opening direction by a predetermined number of pulses equal to or larger than a maximum number of pulses for driving the valve in full stroke, or
- a second initialization operation of allowing a rotation of the stepping motor in the valve opening direction by at least the number of pulses that corresponds to the current position of the electric valve stored in the storage unit.

* * * * *